UNITED STATES PATENT OFFICE.

MATTHEW L. McDONOUGH, OF CINCINNATI, OHIO.

PROCESS OF STAINING MARBLE.

1,293,832.  Specification of Letters Patent.  Patented Feb. 11, 1919.

No Drawing.    Application filed June 18, 1912. Serial No. 704,435.

*To all whom it may concern:*

Be it known that I, MATTHEW L. McDONOUGH, a citizen of the United States, residing at Cincinnati, in the county of Hamilton, and State of Ohio, have invented certain new and useful Improvements in Processes of Staining Marble, of which the following is a specification.

The object of my invention is a process of staining marble, whereby a permanent rich color is imparted to the marble, which gives the marble the property of taking a high polish and which is carried out at little expense.

In the first step of my process the marble is heated by any suitable means, as by steam, fire or any means, or electricity; steam heat being preferred, since therewith the pores of the marble are more open.

While the marble is thus heated, I perform the second step of the process, viz: apply the stain, which consists of a mixture of coal oil, alcohol and an anilin dye of the color desired.

The alcohol and coal oil carry the dye well into the pores of the marble, and are themselves evaporated by the heat of the marble, leaving the dye set in the marble permanently.

The marble may then be polished, and will, after this process, take a higher polish than it would before being subjected thereto. If desired, the marble may be polished before it undergoes the process, and, will in this event, retain the polish so given it, after it has undergone my process of staining.

What I claim as new and my invention and desire to secure by Letters Patent is:

1. The process of staining marble, which consists in first subjecting the marble to heat and second applying to the heated marble a mixture of coal oil, alcohol and an anilin dye, as set forth.

2. The process of staining marble, which consists in first subjecting the marble to steam heat, and second, applying to the marble so heated a mixture of coal oil, alcohol and an anilin dye, as set forth.

In testimony whereof I affix my signature in presence of two witnesses.

MATTHEW L. McDONOUGH.

Witnesses:
W. A. RINCKHOFF,
J. W. STREHLI.